United States Patent
Fan et al.

(10) Patent No.: US 9,179,130 B2
(45) Date of Patent: Nov. 3, 2015

(54) IMAGE-CAPTURING DEVICE AND METHOD HAVING IMAGE IDENTIFICATION MECHANISM

(71) Applicant: HTC Corporation, Taoyuan County (TW)

(72) Inventors: Fu-Cheng Fan, Taoyuan County (TW); Ping-Tsung Tsai, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 173 days.

(21) Appl. No.: 13/911,063

(22) Filed: Jun. 5, 2013

(65) Prior Publication Data
US 2014/0362261 A1 Dec. 11, 2014

(51) Int. Cl.
| | |
|---|---|
| *H04N 9/64* | (2006.01) |
| *H04N 5/228* | (2006.01) |
| *G03B 15/03* | (2006.01) |
| *G03B 15/02* | (2006.01) |
| *H04N 13/02* | (2006.01) |
| *H04N 5/225* | (2006.01) |
| *H04N 9/75* | (2006.01) |

(52) U.S. Cl.
CPC ......... *H04N 13/0253* (2013.01); *H04N 5/2256* (2013.01); *H04N 9/75* (2013.01)

(58) Field of Classification Search
CPC . H04N 9/735; H04N 5/2354; G01N 21/8851; G01N 21/91; G06T 2200/32; G06T 2207/30136; G06T 2207/30164; G06T 7/0004; G06T 7/602; G06T 5/10; G06T 7/0097; G09G 2320/0271; G09G 2320/066
USPC ................... 348/222.1, 223.1, 241, 362, 371; 362/11; 396/155
See application file for complete search history.

(56) References Cited

U.S. PATENT DOCUMENTS

| | | | | |
|---|---|---|---|---|
| 5,781,807 A | * | 7/1998 | Glassgold et al. | 396/71 |
| 7,742,057 B2 | * | 6/2010 | Ou-Yang et al. | 345/589 |
| 2008/0175579 A1 | * | 7/2008 | Kawakami | 396/155 |

(Continued)

FOREIGN PATENT DOCUMENTS

| | | |
|---|---|---|
| CN | 101563650 A | 10/2009 |
| CN | 101669358 A | 3/2010 |

(Continued)

OTHER PUBLICATIONS

Corresponding Taiwanese office action that these art references were cited.

*Primary Examiner* — Trung Diep
(74) *Attorney, Agent, or Firm* — CKC & Partners Co., Ltd.

(57) ABSTRACT

An image-capturing device having an image identification mechanism is provided. The image-capturing device comprises a first and a second flashlight modules, a processing module and an image-capturing module. The first and the second flashlight modules generate a first and a second color lights respectively according to a first and a second currents. The processing module controls the first and the second flashlight modules to flash light at an object sequentially within a time interval. The image-capturing module generates a first frame according to the object and the first color light and generates a second frame according to the object and the second color light. The processing module subtracts the pixels in the first and the second frames to retrieve a foreground area. A color difference between the first and the second frames for each the pixels in the foreground area is larger than a threshold value.

20 Claims, 5 Drawing Sheets

(56) References Cited

U.S. PATENT DOCUMENTS

| | | |
|---|---|---|
| 2009/0096897 A1* | 4/2009 | Saito ............................ 348/241 |
| 2010/0189429 A1* | 7/2010 | Butterworth .................. 396/155 |
| 2013/0128103 A1* | 5/2013 | Spielberg ...................... 348/371 |

FOREIGN PATENT DOCUMENTS

| | | |
|---|---|---|
| TW | 201032178 A | 9/2010 |
| TW | 201307979 A | 2/2013 |

* cited by examiner

IMAGE-CAPTURING DEVICE AND METHOD HAVING IMAGE IDENTIFICATION MECHANISM

BACKGROUND

1. Technical Field

The present invention relates to an image identification technology. More particularly, the present invention relates to an image-capturing device and a image-capturing method having an image-identification mechanism.

2. Description of Related Art

The invention of the digital camera is a major progress of the image-capturing technology. Through the help of the digital signal process, the storage of the images becomes convenient. Further, instant calibration and adjustment of various parameters can be performed by using digital image processing techniques. A satisfying image-capturing result can be accomplished.

During the image-capturing process, it is important to separate the foreground area from the background area of the image to further perform image processing and calibration on the foreground area, which is the critical part of the image. Common image identification technologies segment the foreground area according to the detection of the moving edges of the objects. The moving edges generated by the motion of the objects between different frames are used to segment the objects that are moving as the foreground area. However, the generated frames used in such a detection method has to separate from each other by at least 10 frame periods such that the motion of the objects is obvious. Further, the detection result is easily disturbed when the objects in the background area are moving as well.

Accordingly, what is needed is an image-capturing device and an image-capturing method having an image-identification mechanism to avoid the long detection time and the disturbance of the moving background objects.

SUMMARY

An aspect of the present invention is to provide an image-capturing device having an image identification mechanism. The image-capturing device comprises a first flashlight module, a second flashlight module, a processing module and a processing module. The first flashlight module generates a first color light according to a first current. The second flashlight module generates a second color light according to a second current. The processing module controls the first and the second flashlight modules to flash light at an object sequentially within a time interval. The image-capturing module generates a first frame according to the object and the first color light, and generates a second frame according to the object and the second color light. The processing module further subtracts the pixels in the first and the second frames to retrieve a foreground area, in which a color difference between the first and the second frames for each of the pixels in the foreground area is larger than a threshold value.

Another aspect of the present invention is to provide an image-capturing method having an image identification mechanism. The image-capturing method includes the steps outlined below. A first flashlight module and a second flashlight module are controlled to flash light at an object sequentially within a time interval, wherein the first flashlight module generates a first color light according to a first current and the second flashlight module generates a second color light according to a second current. An image-capturing module is controlled to generate a first frame according to the object and the first color light and to generate a second frame according to the object and the second color light. The pixels in the first and the second frames are subtracted to retrieve a foreground area, in which a color difference between the first and the second frames for each of the pixels in the foreground area is larger than a threshold value.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
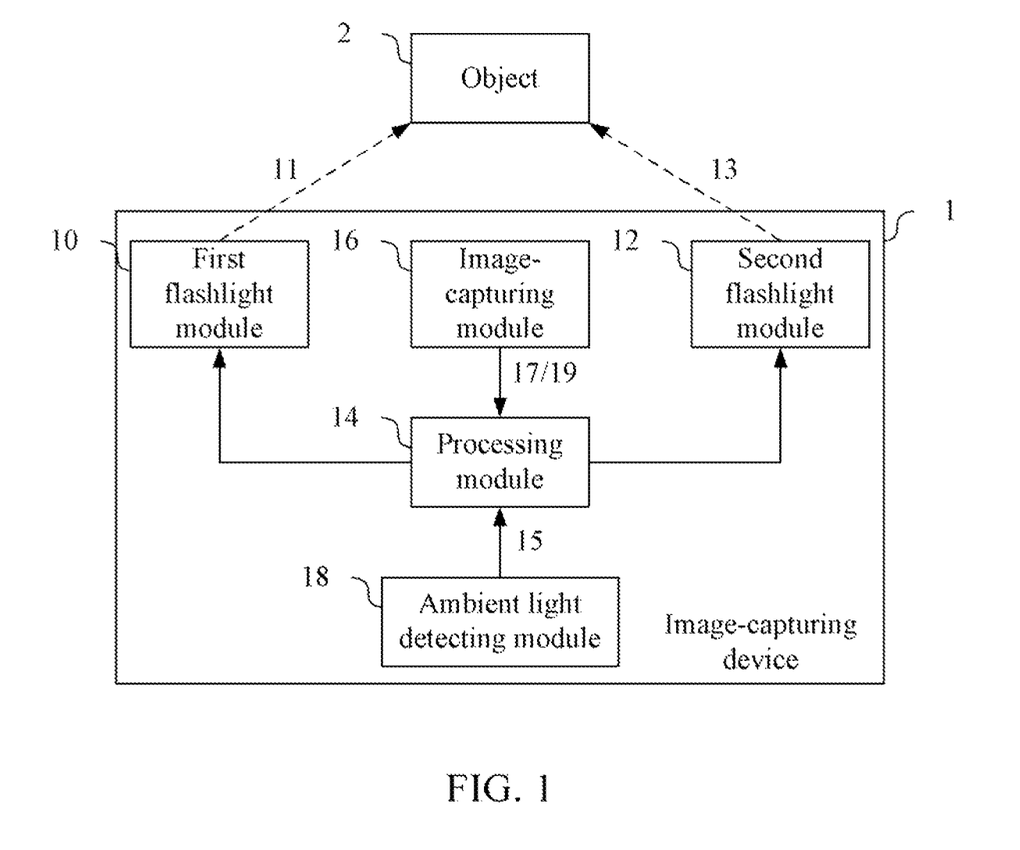
FIG. 1 is a block diagram of an image-capturing device having an image identification mechanism in an embodiment of the present embodiment.

FIG. 1 is a block diagram of an image-capturing device 1 having an image identification mechanism in an embodiment of the present embodiment. The image-capturing device 1 comprises a first flashlight module 10, a second flashlight module 12, a processing module 14 and an image-capturing module 16.

The first flashlight module 10 generates a first color light 11 according to a first current (not shown). The second flashlight module 12 generates a second color light 13 according to a second current (not shown). In an embodiment, the first color light 11 generated by the first flashlight module 10 is a warm color light and the second color light 13 generated by the second flashlight module 12 is a cold color light. In another embodiment, the first color light 11 is a cold color light and the second color light 13 is a warm color light. In yet another embodiment, the first and the second color lights 11 and 13 have a color difference within a reasonable range and each of the first and the second color lights 11 and 13 is not limited to either the warm color light or the cold color light.

In an embodiment, the terms "warm color" and "cold color" are defined according to the color temperature. The color temperature is used to measure the color of a light or a light source by the unit of kelvin (K). More specifically, the color temperature is the temperature when an ideal black body is heated until it delivers the light having the same color as the underdetermined light or light source. For example, the light having the color temperature within the range of 2700K-3000K is close to the warm color light (such as the color transiting from yellow to red) and the light having the color temperature within the range above 5000K is close to the cold color light (such as the blue). Hence, for example, the first color light generated by the first flashlight module 10 can be set as the light having the color temperature of 3000K. The second color light generated by the second flashlight module 12 can be set as the light having the color temperature of 5500K. However, it is noted that the above values of the color temperature are merely an example. In other embodiments, the color temperature of the lights can be other values and is not limited to the above.

The processing module 14 can control the first and the second flashlight modules 10 and 12 to determine the timing of the generation of the first color light 11 and the second color light 13, current values of the first current and the second current and the ratio between the first current and the second current. The current values of the first current and the second current determine the intensity of the first color light 11 and the second color light 13. The ratio between the first current and the second current determines the color temperature of the total output light including the first color light 11 and the second color light 13 that are generated simultaneously.

In an embodiment, the image-capturing device 1 further comprises an ambient light detecting module 18 to detect an ambient light intensity 15 of an ambient light of the environment where the image-capturing device 1 is located. When the ambient light intensity 15 is too high, the processing module 14 decreases the current values of the first current and the second current simultaneously to lower the intensity of the first color light 11 and the second color light 13. When the ambient light intensity 15 is not enough, the processing module 14 increases the current values of the first current and the second current simultaneously to increase the intensity of the first color light 11 and the second color light 13. It is noted that in different embodiments, the adjustment of the current values of the first current and the second current can be performed with the same scale or with different scales.

Therefore, the processing module 14 can control the first flashlight module 10 and the second flashlight module 12 to generate the first color light 11 and the second color light 13 in turn within a specific time interval to flash light at an object 2 that is the target of the image-capturing device 1. The image-capturing module 16 generates a first frame 17 of the object 2 according to the first color light 11 and generates a second frame 19 of the object 2 according to the second color light 13.

The processing module 14 further subtracts the corresponding pixels in the first and the second frames 17 and 19 to retrieve a foreground area. The color difference between the first frame 17 and the second frame 19 for each of the pixels of the foreground area is larger than a threshold value. Hence, the processing module 14 can segment the pixels having the color difference larger than the threshold value between the first frame 17 and the second frame 19 as the foreground area, in which the other pixels belong to the background area.

Figure 2:
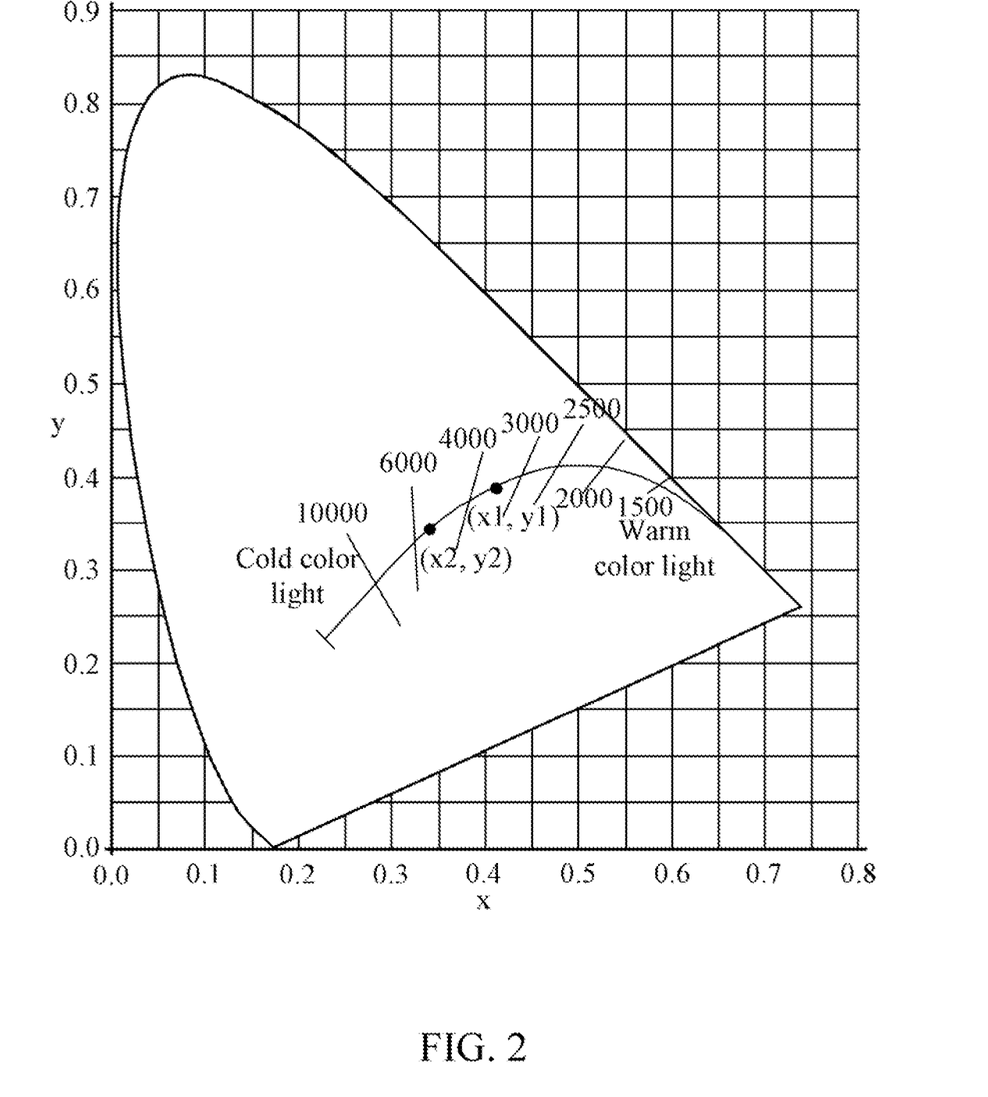
FIG. 2 is a CIE1931 chromaticity diagram in an embodiment of the present invention.

In an embodiment, the color difference is computed according to the difference of the coordinates of the color of the pixels on a CIE1931 chromaticity diagram, in which each of the coordinates represent the color value of a pixel on the first frame 17 or the second frame 19. FIG. 2 is a CIE1931 chromaticity diagram in an embodiment of the present invention. For example, when the coordinate on the CIE1931 chromaticity diagram of the color value of a pixel on the first frame 17 is (x1, y1) and the coordinate on the CIE1931 chromaticity diagram of the color value of the same pixel on the second frame 17 is (x2, y2), the color difference is computed by the following equation:

$$\Delta E = \sqrt{(x1-x2)^2 + (y1-y2)^2}$$

Therefore, by using an appropriate threshold value, the processing module 14 can perform the computation described above and determine whether the pixel belongs to the foreground area or not. It is noted that in other embodiments, the color values corresponding to the coordinates on the CIE1976 chromaticity diagram or other color computation methods can be used to determine the foreground area. The color computation method is not limited by the embodiment mentioned above.

Figure 3A:
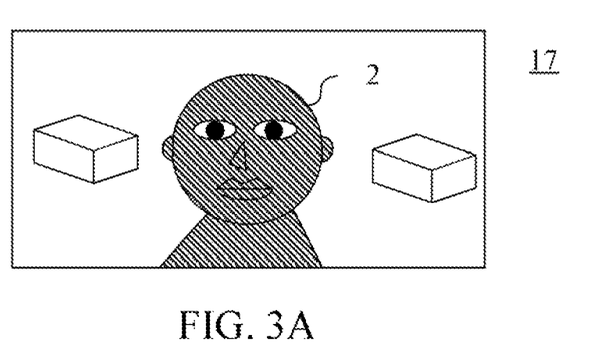
FIG. 3A is an exemplary diagram of the first frame in an embodiment of the present invention.
Figure 3B:
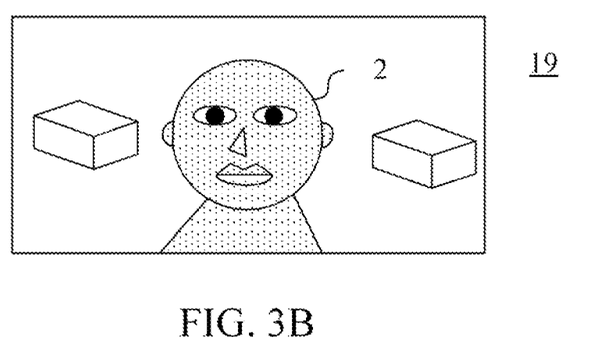
FIG. 3B is an exemplary diagram of the second frame in an embodiment of the present invention.
Figure 3C:
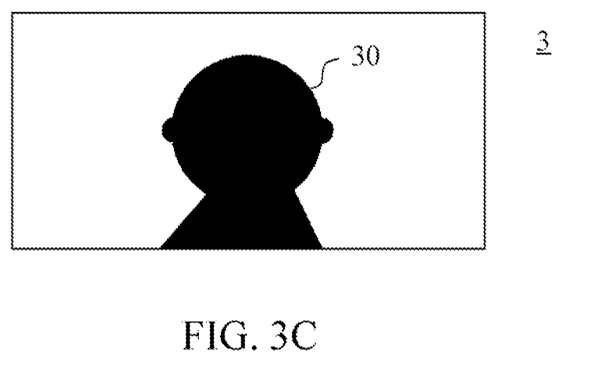
FIG. 3C is an exemplary diagram of a frame that has the segmented foreground area in an embodiment of the present invention.

FIG. 3A is an exemplary diagram of the first frame 17 in an embodiment of the present invention. FIG. 3B is an exemplary diagram of the second frame 19 in an embodiment of the present invention. FIG. 3C is an exemplary diagram of a frame 3 that has the segmented foreground area 30 in an embodiment of the present invention.

As shown in FIG. 3A and FIG. 3B, since the human face (i.e. the object 2) in the diagrams is in front of other objects, the colors of the face in the first frame 17 and the second frame 19 have a huge difference due to the flashing of the first color light 11 and the second color light 13, while the other objects are not affected by the first color light 11 and the second color light 13 as much as the face. Therefore, each of the pixels in the first frame 17 and the second frame 19 is subtracted and the subtracted values are compared with the threshold value to generate the frame 3 that includes the foreground area 30 corresponding to the face, as shown in FIG. 3C.

In conventional technologies, the foreground area is retrieved according to the moving edges of the objects between two frames. Therefore, the generated time between the two frames should be longer, and the determination of the foreground area depends on the motion of the object. However, since the image-capturing device having the image-identification mechanism in the present invention retrieves the foreground area by determining the color difference between the pixels of two frames that are generated sequentially using different lights from different flashlight modules, a better and more accurate result of the determination of the foreground area is accomplished when the object stays still. Accordingly, the determination of the foreground area is more accurate when the time interval between the two frames is shorter. The distance of the movement of the object between the two frames computed by the processing module is kept small.

In an embodiment, the time interval can be the frame period of the image-capturing module 16. In the present embodiment, the frame period is the inverse of the frame rate. For example, if the frame period of the image-capturing module 16 is 1/30 seconds, the time interval between the flashing activities performed by the first flashlight module 10 and the second flashlight module 12 can be set as 1/30 seconds. When the frame period of the image-capturing module 16 is 1/60 seconds, the time interval between the flashing activities performed by the first flashlight module 10 and the second flashlight module 12 can be set as 1/60 seconds. It is noted that the values mentioned above is merely an example. In different applications, the values are not limited by those described above.

In addition, the object 2 that locates in the foreground area is generally close to the image-capturing device 1 compared to the objects in the background area. Hence, the first color light 11 and the second color light 13 mainly affect the color of the object 2 more than the objects in the background area. After computing the color difference of each of the pixels in the first frame 17 and the second frame 19, the pixels having a larger color difference (larger than the threshold value) are determined to be within the foreground area and the pixels having a smaller color difference (smaller than the threshold value) are determined to be within the background area.

In an embodiment, after retrieving the foreground area, the processing module 14 further computes a first color difference based on a first color value of the pixels of the foreground area of the first frame 17 and a target color value, computes a second color difference based on a second color value of the pixels of the foreground area of the second frame 19 and the target color value, and generates a weighting ratio according to the first color difference and the second color difference to adjust a current ratio between the first current and the second current. After the adjustment of the current ratio between the first current and the second current, the processing module 14 can control the first flashlight module 10 and the second flashlight module 12 to flash light at the object 2 simultaneously according to the current ratio such that the image-capturing module 16 generates an adjusted frame.

In an embodiment, the first color value is computed by averaging the color values of the pixels of the foreground area of the first frame 17, by taking a median value of the color values of the pixels of the foreground area of the first frame 17 or by using other possible computation methods. On the other hand, the second color value is computed by averaging the color values of the pixels of the foreground area of the second frame 19, by taking a median value of the color values of the pixels of the foreground area of the second frame 19 or by using other possible computation methods.

Similarly, the first color difference and the second color difference are computed according to such as, but not limited to the color values corresponding to the coordinates of the CIE1931 chromaticity diagram. For example, if the first color value (x1, y1) of a pixel in the foreground area in the first frame 17 (generated by using the first color light having the color temperature such as 3000K), and the second color value (x2, y2) of a pixel in the foreground area in the second frame 19 (generated by using the second color light having the color temperature such as 5500K), the first color difference $\Delta E_{3000}$ and the second color difference $\Delta E_{5500}$ can be computed by the following equations:

$$\Delta E_{3000} = \sqrt{(x1-x)^2 + (y1-y)^2}$$

$$\Delta E_{5500} = \sqrt{(x2-x)^2 + (y2-y)^2}$$

In an embodiment, the processing module 14 determines the color range of the object 2 when the image-capturing module 16 generates the first frame 17 and the second frame 19 and generates the target color value according to default values. For example, when the object 2 is a human face, different target color values can be used according to the skin color of the human. If the object 2 is the face of a white human, a target color value having a warmer color temperature (such as the values close to 3000K) can be used to prevent the object 2 in the generated image from being too white. If the object 2 is the face of a yellow human, a target color value having a cooler color temperature (such as the values close to 4000K) can be used to prevent the object 2 in the generated image from being too red or too yellow. If the object 2 is the face of a black human, a target color value having an even cooler color temperature (such as the values close to 5500K) can be used to prevent the object 2 in the generated image from being too dark. In another embodiment, the target color value is generated by the user manually.

In an embodiment, the current ratio between the first current and the second current is decreased when the first color difference is larger than the second color difference, and the current ratio between the first current and the second current is increased when the first color difference is smaller than the second color difference. For example, if the target color value is 3500, the first color value of the pixels in the foreground area in the first frame 17 is 3200 and the second color value of the pixels in the foreground area in the second frame 19 is 4500, the object may have a relatively cooler color itself or may have a relatively cooler color because of the effect of the ambient light. The current ratio between the warm color light (e.g. the first color light 11) and the cold color light (e.g. the second color light 13) can thus be increased. After the current ratio is increased, the two flashlight modules flash light at the object and the image-capturing module 16 generates the image accordingly. The color value of the generated image can be close to the target color value. A better image-capturing result is obtained.

Accordingly, in the present embodiment, the image-capturing device 1 not only retrieves the foreground area, but also compares the color value of the foreground area with a target color value. The image-capturing device 1 can thus generate the image by flashing light at the object by using the two flashlight modules according to the adjusted current ratio between the first flashlight module 10 and the second flashlight module 12. A better image-capturing result is obtained.

In another embodiment, the processing module 14 controls the image-capturing module 16 to focus on the foreground area to generate a focused frame after retrieving the foreground area.

Figure 4:
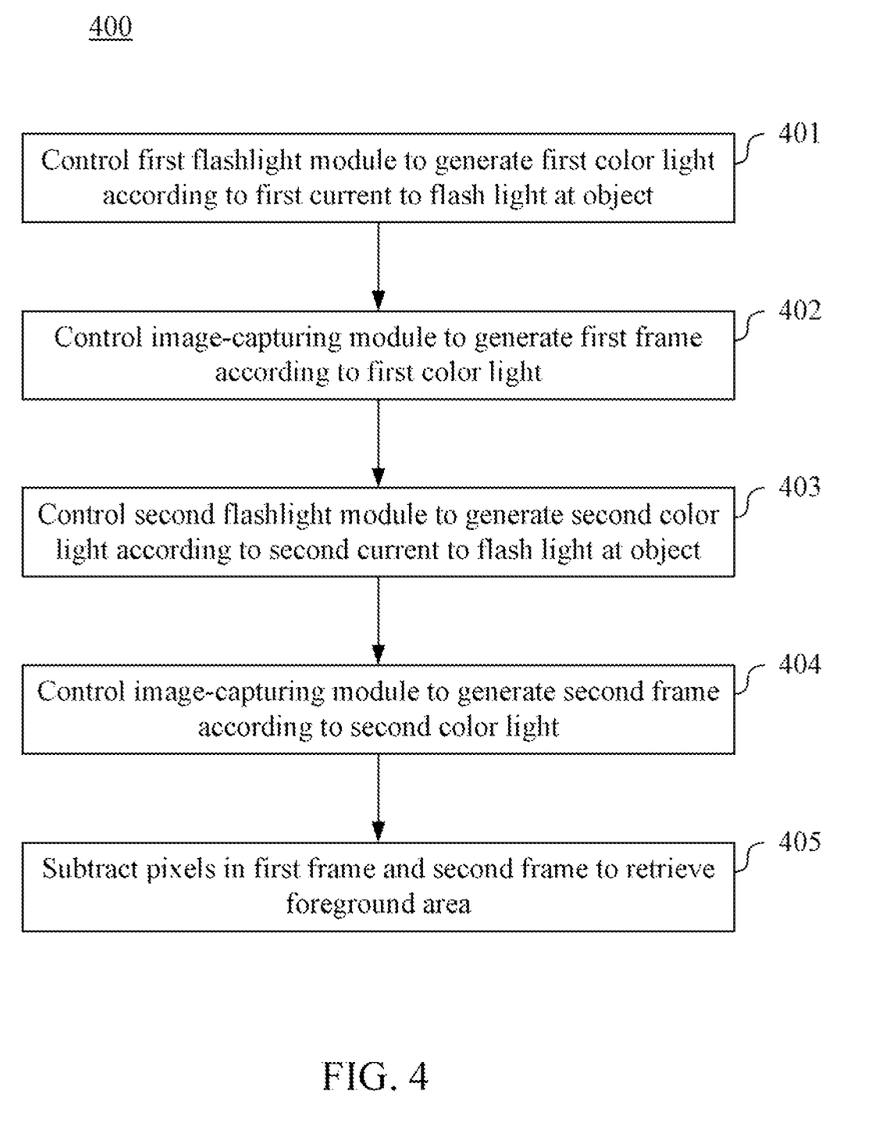
FIG. 4 is a flow chart of an image-capturing method having the image identification mechanism in an embodiment of the present invention.

FIG. 4 is a flow chart of an image-capturing method 400 having the image identification mechanism in an embodiment of the present invention. The image-capturing method 400 can he used in the image-capturing device 1 depicted in FIG. 1. The image-capturing method 400 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, the processing module 14 controls the first flashlight module 10 to generate a first color light 11 according to a first current to flash light at an object 2.

In step 402, the processing module 14 controls the image-capturing module 16 to generate a first frame 17 of the object 2 according to the first color light 11.

In step 403, the processing module 14 controls the second flashlight module 10 to generate a second color light 13 according to a second current to flash light at an object 2 after capturing the first frame 17 within a time interval.

In step 404, the processing module 14 controls the image-capturing module 16 to generate a second frame 19 of the object 2 according to the second color light 13.

In step 405, the processing module 14 subtracts the pixels in the first and the second frames to retrieve a foreground area, in which a color difference between the first and the second frames for each the pixels in the foreground area is larger than a threshold value.

Figure 5:
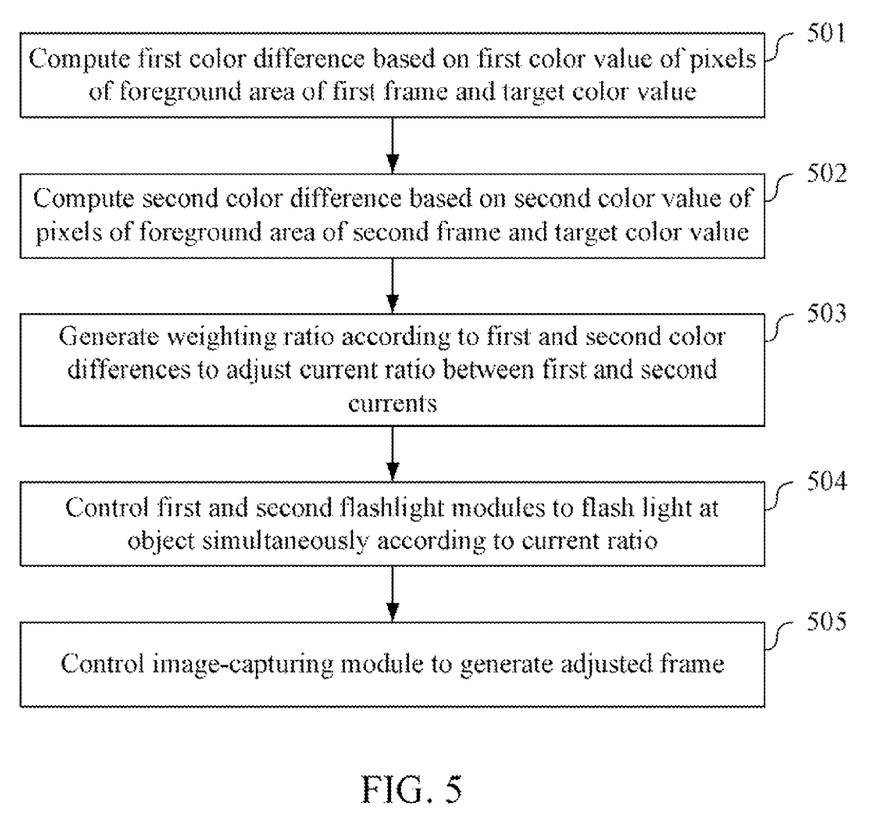
FIG. 5 is a flow chart of a subsequent flow subsequent to the steps of the image-capturing method in an embodiment of the present invention.

FIG. 5 is flow chart 500 of a subsequent flow subsequent to the steps of the image-capturing method in an embodiment of the present invention. In the present embodiment, the steps in the flow chart 500 are performed subsequent to step 405 of the image-capturing method 400 shown in FIG. 4.

After the foreground area is retrieved in step 405 of FIG. 4, the processing module 14 computes a first color difference based on a first color value of the pixels of the foreground area of the first frame 17 and a target color value in step 501.

In step 502, the processing module 14 computes a second color difference based on a second color value of the pixels of the foreground area of the second frame 19 and the target color value.

In step 503, the processing module 14 generates a weighting ratio according to the first color difference and the second color difference to adjust a current ratio between the first current and the second current.

In step 504, the processing module 14 controls the first flashlight module 10 and the second flashlight module 12 to flash light at the object 2 simultaneously according to the current ratio.

In step 505, the processing module 14 controls the image-capturing to module 16 generate an adjusted frame.

Figure 6:
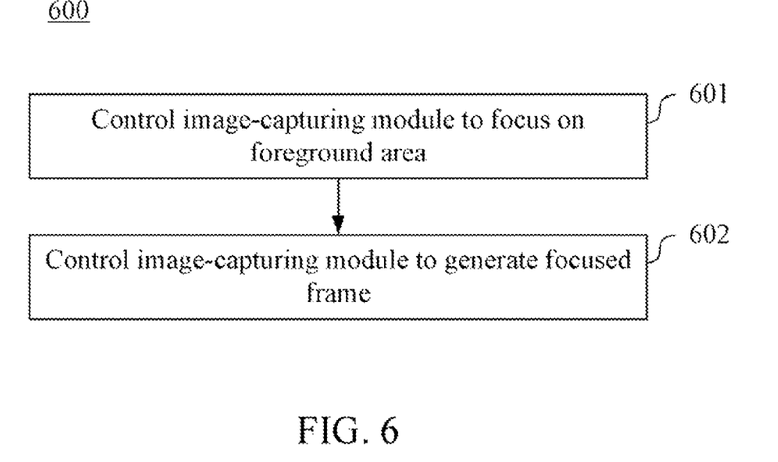
FIG. 6 is a flow chart of a subsequent flow subsequent to the steps of the image-capturing method in another embodiment of the present invention.

FIG. 6 is a flow chart 500 of a subsequent flow subsequent to the steps of the image-capturing method in another embodiment of the present invention. In the present embodiment, the steps in the flow chart 600 are performed subsequent to step 405 of the image-capturing method 400 shown in FIG. 4.

After the foreground area is retrieved in step 405 of FIG. 4, the processing module 14 controls the image-capturing module 16 to focus on the foreground area in step 601.

In step 602, the processing module 14 controls the image-capturing module 16 to generate a focused frame after retrieving the foreground area.

The image-capturing device uses the first and the second flashlight modules to generate different color lights. The image-capturing module further generates different frames sequentially according to the different color lights and subtracts the pixels between the frames to obtain the foreground area for subsequent calibration and adjustment. The foreground area can be retrieved efficiently without taking a long time and without being disturbed by the moving objects in the background area. It is noted that in the above embodiments, the color of the light is determined according to color temperatures. In other embodiments, it is possible to use other parameters to measure the color of the light. The determination of the color of the light is not limited by the use of the color temperature.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image-capturing device having an image identification mechanism, comprising:
a first flashlight module to generate a first color light according to a first current;
a second flashlight module to generate a second color light according to a second current;
a processing module to control the first and the second flashlight modules to flash light at an object sequentially within a time interval; and
an image-capturing module to generate a first frame according to the object and the first color light and to generate a second frame according to the object and the second color light;
wherein the processing module further subtracts the pixels in the first and the second frames to retrieve a foreground area, in which a color difference between the first and the second frames for each of the pixels in the foreground area is larger than a threshold value.

2. The image-capturing device of claim 1, wherein the processing module further computes a first color difference based on a first color value of the pixels of the foreground area of the first frame and a target color value, computes a second color difference based on a second color value of the pixels of the foreground area of the second frame and the target color value, and generates a weighting ratio according to the first color difference and the second color difference to adjust a current ratio between the first current and the second current.

3. The image-capturing device of claim 2, wherein the processing module further controls the first flashlight module and the second flashlight module to simultaneously flash light at the object according to the current ratio such that the image-capturing module generates an adjusted frame.

4. The image-capturing device of claim 2, wherein the current ratio between the first current and the second current is decreased when the first color difference is larger than the second color difference, and the current ratio between the first current and the second current is increased when the first color difference is smaller than the second color difference.

5. The image-capturing device of claim 2, wherein the first color value is computed by averaging the color values of the pixels of the foreground area of the first frame or by taking a median value of the color values of the pixels of the foreground area of the first frame, and the second color value is computed by averaging the color values of the pixels of the foreground area of the second frame or by taking a median value of the color values of the pixels of the foreground area of the second frame.

6. The image-capturing device of claim 1, further comprising an ambient light detecting module to detect a strength of an ambient light such that the processing module adjusts current values of the first current and the second current according to the strength of the ambient light.

7. The image-capturing device of claim 1, wherein the processing module controls the image-capturing module to focus on the foreground area to generate a focused frame after retrieving the foreground area.

8. The image-capturing device of claim 1, wherein one of the first and the second color lights is a warm color light and the other one is a cold color light.

9. The image-capturing device of claim 1, wherein the time interval is a frame time of the image-capturing module.

10. The image-capturing device of claim 1, wherein the color difference is a coordinate difference on a CIE1931 chromaticity diagram or a CIE1976 chromaticity diagram.

11. An image-capturing method having an image identification mechanism, comprising:
controlling a first flashlight module and a second flashlight module to flash light at an object sequentially within a time interval, wherein the first flashlight module generates a first color light according to a first current and the second flashlight module generates a second color light according to a second current;
controlling an image-capturing module to generate a first frame according to the object and the first color light and to generate a second frame according to the object and the second color light; and subtracting the pixels in the first and the second frames to retrieve a foreground area, in which a color difference between the first and the second frames for each of the pixels in the foreground area is larger than a threshold value.

12. The image-capturing method of claim 11, further comprising:
computing a first color difference based on a first color value of the pixels of the foreground area of the first frame and a target color value;
computing a second color difference based on a second color value of the pixels of the foreground area of the second frame and the target color value; and
generating a weighting ratio according to the first color difference and the second color difference to adjust a current ratio between the first current and the second current.

13. The image-capturing method of claim 12, further comprising:
controlling the first flashlight module and the second flashlight module to flash light at the object simultaneously according to the current ratio; and
generating an adjusted frame by the image-capturing module.

14. The image-capturing method of claim 12, wherein the current ratio between the first current and the second current is decreased when the first color difference is larger than the second color difference, and the current ratio is increased when the first color difference is smaller than the second color difference.

15. The image-capturing method of claim 12, further comprising:
computing the first color value by averaging the color values of the pixels of the foreground area of the first frame or by taking a median value of the color values of the pixels of the foreground area of the first frame; and
computing the second color value by averaging the color values of the pixels of the foreground area of the second frame or by taking a median value of the color values of the pixels of the foreground area of the second frame.

16. The image-capturing method of claim 11, further comprising:
detecting a strength of the ambient light; and
adjusting current values of the first current and the second current according to the strength of the ambient light.

17. The image-capturing method of claim 11, further comprising:
controlling the image-capturing module to focus on the foreground area to generate a focused frame.

18. The image-capturing method of claim 11, wherein one of the first and the second color lights is a warm color light and the other one is a cold color light.

19. The image-capturing method of claim 11, wherein the time interval is a frame time of the image-capturing module.

20. The image-capturing method of claim 11, wherein the color difference is a coordinate difference on a CIE1931 chromaticity diagram or a CIE1976 chromaticity diagram.

* * * * *